(12) United States Patent
Sun (10) Patent No.: US 9,363,111 B1
(45) Date of Patent: Jun. 7, 2016

(54) DECISION FEEDBACK EQUALIZER (DFE) UTILIZING ERROR PROPAGATION INFORMATION

(71) Applicant: Marvell International Ltd., Hamilton (BM)

(72) Inventor: Junqing Sun, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/666,666

(22) Filed: Mar. 24, 2015

Related U.S. Application Data

(60) Provisional application No. 61/970,662, filed on Mar. 26, 2014.

(51) Int. Cl.
*H04L 25/03* (2006.01)

(52) U.S. Cl.
CPC .................. *H04L 25/03267* (2013.01)

(58) Field of Classification Search
CPC ............ H04L 25/03267; H04L 25/03057; H04L 2025/0349; H04L 1/0047; H04L 25/03178; H04L 25/061; H04L 7/0062; H04B 10/6971
See application file for complete search history.

(56) References Cited

U.S. PATENT DOCUMENTS

| | | | | |
|---|---|---|---|---|
| 6,307,884 B1 * | 10/2001 | Du | ................. | H04L 25/03057 375/229 |
| 6,691,260 B1 * | 2/2004 | Ueno | ............... | G11B 20/10009 375/233 |
| 7,092,438 B2 * | 8/2006 | Rouphael | .......... | H04L 25/03178 375/229 |
| 8,644,369 B1 * | 2/2014 | Katic | ............... | H04L 25/03038 375/232 |

* cited by examiner

*Primary Examiner* — Vineeta Panwalkar (57) ABSTRACT

Embodiments include a method comprising: receiving a signal comprising a plurality of symbols; estimating that a first symbol of the plurality of symbols has a first value; based on the first value of the first symbol, cancelling, at least in part, inter symbol interference that the first symbol has on a second symbol of the plurality of symbols; determining a first error associated with the first value of the first symbol; and in response to the first error being higher than a threshold value, generating, for the first symbol, a second value that is different from the first value of the first symbol, and based on the second value of the first symbol, cancelling, at least in part, inter symbol interference that the first symbol has on the second symbol.

20 Claims, 4 Drawing Sheets

DECISION FEEDBACK EQUALIZER (DFE) UTILIZING ERROR PROPAGATION INFORMATION

CROSS REFERENCE TO RELATED APPLICATIONS

This claims priority to U.S. Provisional Patent Application No. 61/970,662, filed on Mar. 26, 2014, which is incorporated herein by reference in its entirety.

TECHNICAL FIELD

Embodiments of the present disclosure relate to a decision feedback equalizer (DFE), and in particular to a DFE utilizing error propagation information.

BACKGROUND

In communication, intersymbol interference (ISI) is a form of distortion of a signal in which one symbol interferes with one or more subsequent symbols. This is an unwanted phenomenon, as the previous symbols have similar effect as noise, thus making the communication less reliable. ISI is usually caused by multipath propagation or the inherent non-linear frequency response of a channel, causing successive symbols to blur together.

Figure 1:
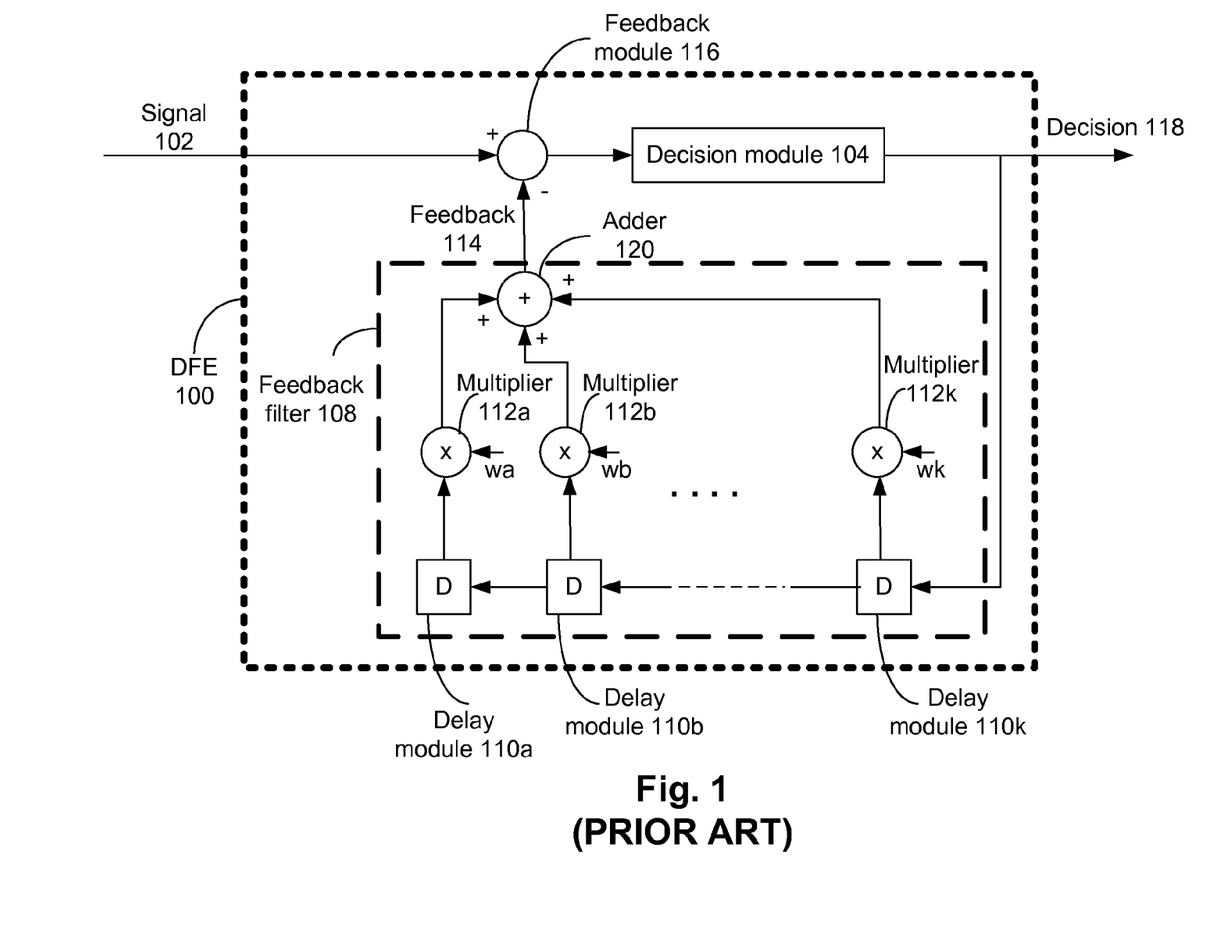
FIG. 1 schematically illustrates a conventional DFE for mitigating effects of ISI in a signal received over a communication channel.

Adaptive equalizers are often used to at least in part mitigate effects of ISI. Decision feedback equalizer (DFE) is an example of an adaptive equalizer. FIG. 1 schematically illustrates a conventional DFE 100 for mitigating effects of ISI in a signal received over a communication channel. The DFE 100 receives a signal 102. The signal 102, for example, is received by an antenna (not illustrated in FIG. 1) over a wireless communication channel (not illustrated in FIG. 1) and appropriately pre-processed (e.g., using a pre-filter, not illustrated in FIG. 1), prior to the DFE 100 receiving the signal 102.

The DFE 100 comprises a decision module 104 configured to receive the signal 102, after the signal 102 has been processed by a feedback module 116. In an example, the signal 102 comprises a plurality of symbols, where each symbol represents one or more bits. For example, the signal 102 comprises a stream of symbols . . . , Sa, Sb, . . . , Sk, S(k+1), . . . , and so on, received in that order (e.g., symbol S(k+1) is received subsequent to receiving the symbol Sk, symbol Sb is received subsequent to receiving the symbol Sa, and so on). The decision module 104 estimates a value of each symbol in the signal 102, represented as decision 118 in FIG. 1.

As previously discussed herein, because of ISI, a symbol can have effect on one or more subsequent symbols. To mitigate the effects of ISI, the DFE 100 comprises feedback filter 108 configured to receive the decision 118, and output a feedback signal 114 (also referred to herein as "feedback 114"). The feedback module 116 receives the signal 102 and the feedback 114. The feedback module 116, for example, subtracts the feedback 114 from the signal 102 to generate an output, and the output of the feedback module 116 is received by the decision module 104. In an example, the feedback 114 represents effects of one or more previous symbols on the current symbol being processed by the decision module 104 (e.g., represents estimated inter symbol interferences of one or more previous symbols on the current symbol).

In an example, the feedback filter 108 comprises a plurality of delay modules 110a, 110b, . . . , 110k, a corresponding plurality of multipliers 112a, . . . , 112k, and an adder 120. The delay module 110k receives the decision 118, delays the decision 118 by a single delay cycle, and transmits the delayed decision to the subsequent delay module 110(k−1), which performs similar operation, as illustrated in FIG. 1. The outputs of the delay modules 110a, 110b, . . . , 110k are respectively received by the multipliers 112a, 112b, . . . , 112k. The multipliers 112a, 112b, . . . , 112k respectively multiple the respective input signals with weights wa, wb, . . . , wk. The outputs from the multipliers 112a, 112b, . . . , 112k are added in the adder 120, which generated the feedback 114.

In an example, due to the delay provided by the delay modules 110a, . . . , 110k, if symbol S(K+1) is currently being processed by the decision module 104, then: the delay module 110k outputs the decision for the symbol Sk; the delay module 110b outputs the decision for the symbol Sb; the delay module 110a outputs the decision for the symbol Sa; and so on. Thus, the decisions for the symbols Sa, . . . , Sk are respectively multiplied by multipliers wa, . . . , wk, and added to form the feedback 114. A weight (e.g., the weight wa) is calibrated such that the output of the corresponding multiplier (e.g., the multiplier 112a) represents an estimated effect of the corresponding symbol Sa on the symbol S(k+1) currently being processed by the decision module 104. Thus, the feedback 114 represents the cumulative or total effects (e.g., total ISI) of the symbols Sa, . . . , Sk on the current symbol S(k+1). In an example, the number of previous symbols considered in the DFE 100 (e.g., the number of the multipliers 112a, . . . , 112k) is based on a desired accuracy of the DFE 100, and can be any appropriate number.

In an example, in the DFE 100, the decisions corresponding to the signals Sa, . . . , Sk affect the decision corresponding to the symbol S(k+1) taken by the decision module 104. Assume, for example, that the decision by the decision module 104 corresponding to the symbol Sb is erroneous (e.g., the symbol Sb has a value of 1, although the decision module 104 erroneously decides that the value of the symbol Sb is 0). Such an erroneous decision of the symbol Sb will propagate to the decisions of subsequent symbols as well. For example, as the decision of the symbol Sb directly affects the decision for the symbols Sc, . . . , S(k+1) (and indirectly affects decision of subsequent symbols as well), an erroneous decision for the symbol Sb will propagate and negatively impact the decisions of various other subsequent symbols, and has a cascading effect.

SUMMARY

In various embodiments, the present disclosure provides method comprising: receiving a signal comprising a plurality of symbols; estimating that a first symbol of the plurality of symbols has a first value; based on the first value of the first symbol, cancelling, at least in part, inter symbol interference that the first symbol has on a second symbol of the plurality of symbols; determining a first error associated with the first value of the first symbol; and in response to the first error being higher than a threshold value, generating, for the first symbol, a second value that is different from the first value of the first symbol, and based on the second value of the first symbol, cancelling, at least in part, inter symbol interference that the first symbol has on the second symbol.

In various embodiments, the present disclosure also provides a system comprising: a first decision feedback equalizer; a second decision feedback equalizer, wherein each of the first decision feedback equalizer and the second decision feedback equalizer is configured to receive a signal comprising a plurality of symbols, wherein the first decision feedback equalizer is further configured to (i) estimate that a first symbol of the plurality of symbols has a first value, (ii) based on the first value of the first symbol, cancel, at least in part, inter symbol interference that the first symbol has on a second symbol of the plurality of symbols, and (iii) determine a first error associated with the first value of the first symbol; and an error detector module configured to detect whether the first error is higher than a threshold value, wherein the second decision feedback equalizer is further configured to, in response to the first error being higher than the threshold value, (i) receive a second value of the first symbol that is different from the first value of the first symbol, and (ii) based on the second value of the first symbol, cancel, at least in part, inter symbol interference that the first symbol has on the second symbol.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 2:
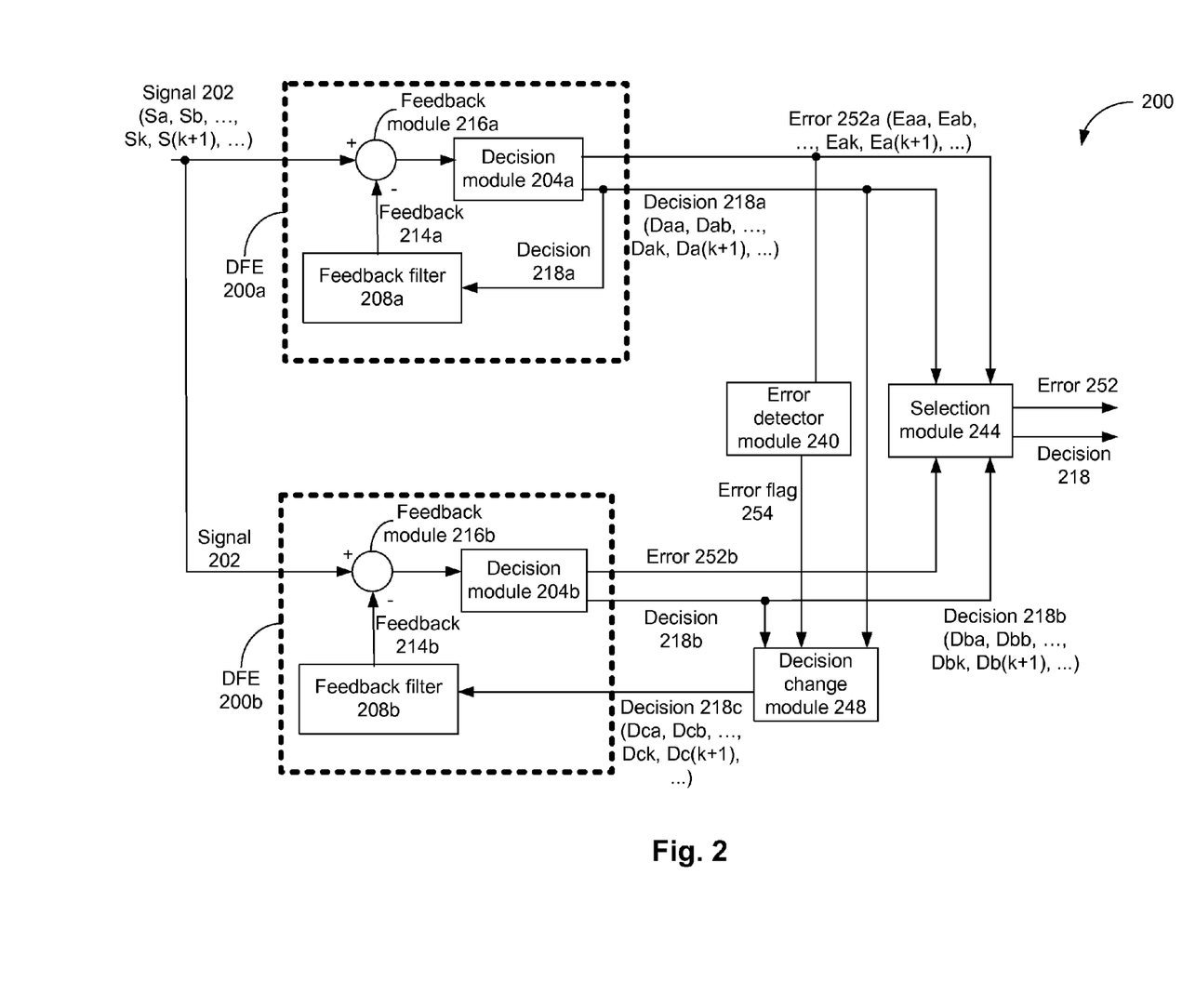
FIG. 2 schematically illustrates a system for mitigating effects of ISI in a signal received over a communication channel, in accordance with an embodiment of the present disclosure.

FIG. 2 schematically illustrates a system 200 for mitigating effects of ISI in a signal 202 received over a communication channel. In an embodiment, the system 200 comprises two DFEs 200a and 200b. The signal 202, for example, is received by an antenna (not illustrated in FIG. 2) over a wireless communication channel (not illustrated in FIG. 2) and appropriately pre-processed (e.g., using a pre-filter, not illustrated in FIG. 2), prior to the DFEs 200a and 200b receiving the signal 202.

In an embodiment, each of the DFEs 200a and 200b is at least in part similar to the DFE 100 of FIG. 1. For example, similar to the DFE 100 of FIG. 1, the DFE 200a comprises a decision module 204a, a feedback filter 208a, and a feedback module 216a; and the DFE 200b comprises a decision module 204b, a feedback filter 208b, and a feedback module 216b. Although not illustrated in FIG. 2 for purposes of illustrative clarity, each of the feedback filters 208a and 208b comprises components that are at least in part similar to the components included in the feedback filter 108 of FIG. 1. Each of the components of the DFEs 200a and 200b operate at least in part similar to the corresponding components of the DFE 100, and accordingly, a detailed description of these components are omitted herein for purposes of brevity.

In an example, similar to the signal 102 of FIG. 1, the signal 202 comprises a plurality of symbols, where each symbol represents one or more bits. For example, the signal 202 comprises a stream of symbols . . . , Sa, Sb, . . . , Sk, S(k+1), . . . , and so on, received in that order (e.g., symbol S(k+1) is received subsequent to receiving the symbol Sk, symbol Sb is received subsequent to receiving the symbol Sa, and so on).

The decision module 204a estimates a value of each symbol in the signal 202, represented as decision 218a in FIG. 2. In an embodiment, the decision 218a comprises a sequence of decisions Daa, Dab, Dac, . . . , Dak, Da(k+1), . . . , corresponding to the sequence of symbols Sa, Sb, Sc, . . . , Sk, S(k+1), . . . included in the signal 202.

In an embodiment, in addition to generating the decision 218a, the decision module 204a of the DFE 200a also generates an error signal 252a (also referred to herein as "error 252a"). The error 252a comprises a sequence of errors Eaa, Eab, Eac, . . . , Eak, Ea(k+1), . . . , corresponding to the sequence of symbols Sa, Sb, Sc, . . . , Sk, S(k+1), . . . .

Figure 3:
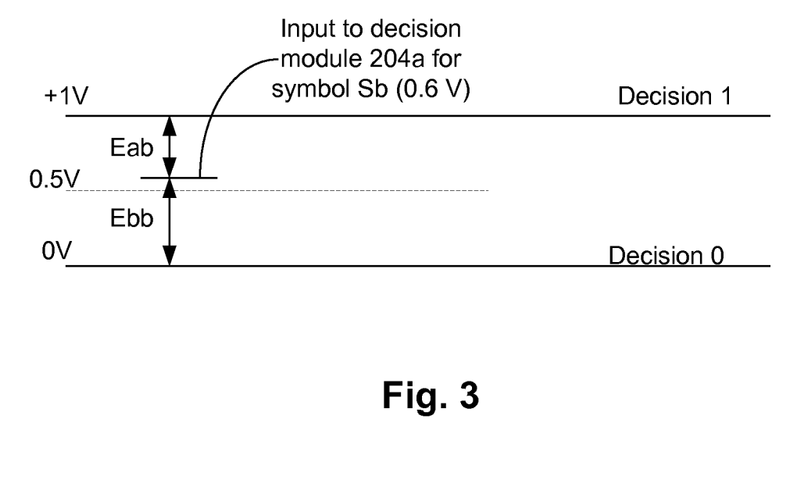
FIG. 3 schematically illustrates a decision making process in the system of FIG. 2, in accordance with an embodiment of the present disclosure.

Merely as an example, assume that each of the symbols can be either 0 or 1, with a value of +1 Volts (V) representing a decision 1 (e.g., which corresponds to the symbol having a value of 1), and a value of 0 V representing a decision 0 (e.g., which corresponds to the symbol having a value of 0), as illustrated in FIG. 3. Now assume that the input to the decision module 204a, corresponding to a symbol (e.g., symbol Sa), is +0.9 V. Then the decision module 204a estimates that the symbol Sa is a bit 1 (i.e., determines decision 1 for symbol Sa), and has an estimated error of 0.1 V in the estimation of the symbol Sa (i.e., Eaa is 0.1 V). Thus, Eaa is an error associated with estimating the value of the symbol Sa.

In another example and as illustrated in FIG. 3, assume that the input to the decision module 204a, corresponding to the Sb, is +0.6 V. Then the decision module 204a estimates that the symbol Sb is a bit 1 (i.e., determines decision 1 for symbol Sb), and has an estimated error of 0.4 V in the estimation of the symbol Sb (i.e., Eaa is 0.4 V). Thus, Eab is an error associated with estimating the value of the symbol Sb.

The decision module 204b of the DFE 200b similarly estimates a value of each symbol in the signal 202, represented as decision 218b in FIG. 2. In an embodiment, the decision 218b comprises a sequence of decisions Dba, Dbb, Dbc, . . . , Dbk, Db(k+1), . . . , corresponding to the sequence of symbols Sa, Sb, Sc, . . . , Sk, S(k+1), . . . included in the signal 202.

Similar to the DFE 200a, in an embodiment, in addition to generating the decision 218b, the decision module 204b of the DFE 200b also generates an error signal 252b (also referred to herein as "error 252b"). The error 252b comprises a sequence of errors Eba, Ebb, Ebc, . . . , Ebk, Eb(k+1), . . . , corresponding to the sequence of symbols Sa, Sb, Sc, . . . , Sk, S(k+1), . . . , and is generated in a manner similar to the generation of the error 252a.

As illustrated in FIG. 2, the feedback filter 208a of the DFE 200a receives the decision 218a, and generates the feedback 214a based on the decision 218a (e.g., similar to the generation of the feedback 114 by the feedback filter 108 of FIG. 1). On the other hand, as illustrated in FIG. 2, the feedback filter 208b of the DFE 200b receives a decision 218c (and not the decision 218b generated by the decision module 204b), and generates the feedback 214a based on the decision 218c.

In an embodiment, the decision 218c is generated by a decision change module 248. In an embodiment, the decision 218c comprises a sequence of decisions Dca, Dcb, Dcc, . . . , Dck, Dc(k+1), . . . , corresponding to the sequence of symbols Sa, Sb, Sc, . . . , Sk, S(k+1), . . . included in the signal 202.

In an embodiment, the system 200 further comprises an error detector module 240, a selection module 244 and the decision change module 248. The error detector module 240 receives the error 252a, and selectively generates an error flag 254 corresponding to one or more of the symbols Sa, . . . , Sk, S(k+1), . . . , based on the error 252a.

For example, the error detector module 240 compares each error of the sequence of errors Eaa, Eab, Eac, ..., Eak, Ea(k+1), ..., of the error 252a with a threshold error Te. If an error of the sequence of errors Eaa, Eab, Eac, ..., Eak, Ea(k+1), ..., is equal to or higher than the threshold error Te, the error detector module 240 generates the error flag 254 for the corresponding symbol.

For example, if the error Eab is at least as high as the threshold error Te, then the error detector module 240 generates the error flag 254 corresponding to the signal Sb. On the other hand, if the error corresponding to a symbol is lower than the threshold error Te, no error flag is generated corresponding to the symbol.

In an embodiment, the decision change module 248 receives the decision 218a, the decision 218b and the error flag 254, and outputs the decision 218c. Assume a first scenario in which no error flag has been generated for any of the symbols Sa, Sb, Sc, ..., Sk, S(k+1), ... of the signal 202. In such a first scenario, the decision change module 248 generates the decision 218c to be equal to the decision 218a (or generates the decision 218c to be equal to the decision 218b). In such a first scenario, both the DFEs 200a and 200b receive the same signal 202 and also receive the same decision 218a as the feedback. Accordingly, in such a first scenario, the DFE 200a and 200b operate using the same signals, and hence, the decisions 218a and 218b are substantially identical (and accordingly, the decision change module 248 can output any of the decisions 218a or 218b as the decision 218c to the feedback filter 208b). Similarly, in such a first scenario, the errors 252a and 252b are also substantially identical. Thus, in such a first scenario, the decision change module 248 does not modify any decision (e.g., does not modify any of the decision 218a and decision 218b, while generating the decision 218c).

Assume a second scenario in which the error detector module 240 generates the error flag 254 corresponding to the symbol Sb, e.g., based on the error Eab being at least as high as the previously discussed threshold error Te. For example and as illustrated in FIG. 3, assume that the input to the decision module 204a, corresponding to the Sb, is +0.6 V. Then the decision module 204a estimates that the symbol Sb is a bit 1 (i.e., determines that Dab corresponds to decision 1 for the symbol Sb), and has an estimated error Eaa of 0.4 V in the estimation of the symbol Sa. Also assume that the threshold error Te for FIG. 3 is 0.3 V. Prior to the symbol Sb, the decision 218c was identical to the decisions 218a and 218b, and the DFEs 200a and 200b operated in substantially similar manner, and the decisions 218a and 218b were substantially identical. However, in the second scenario in which the error detector module 240 generates the error flag 254 corresponding to the symbol Sb, the decision change module 248 changes the decision 218c such that decision 218c is no longer same as the decision 218a. For example, the decision change module 248 generates the decision 218c for the symbol Sb, which is different from the decision Dab of the decision 218a. For example, the decision Dab of the decision 218a corresponds to a decision 1, while the decision Dcb of the decision 218c corresponds to a decision 0 (e.g., see FIG. 3). That is, the decision change module 248 flips or modifies the decision Dab of the decision 218a, corresponding to the symbol Sb for which the error flag 254 was generated, to generate the decision 218c (i.e., to generate the decision Dcb of the decision 218c).

Once the decision change module 248 generates the decision Dcb by modifying the decision Dab, for subsequent symbols, the decision change module 248 outputs the decision 218b as the decision 218c. That is, the decisions Dbc, Dbd, ..., Dbk, Db(k+1) of the decision 218b are output as the decisions Dcc, Dcd, ..., Dck, Dc(k+1) of the decision 218c by the decision change module 248. Thus, for symbol Sb and subsequent symbols, the decisions 218b and 218a are different.

Put differently, once the error detector module 240 determines that the error Eab corresponding to the symbol Sb is higher than the threshold error Te, this indicates a relatively high probability that the decision Dab of the decision 218a is erroneous. Based upon such determination, the DFE 200a continues to operate and generate subsequent decisions, based on the original decision Dab for the symbol Sb. However, based on the relatively high probability that the decision Dab of the decision 218a is erroneous, the DFE 200b operates and generates subsequent decisions, based on a different decision (i.e., decision Dcb) for the symbol Sb. That is, in case the original decision Dab is correct, the subsequent decisions Dac, Dad, ..., Dak, Da(k+1) generated by the DFE 200a will also be correct. On the other hand, in case the original decision Dab is incorrect or erroneous, the subsequent decisions Dbc, Dbd, ..., Dbk, Db(k+1) generated by the DFE 200b will be correct. That is, irrespective of whether the symbol Sb was correctly or incorrectly estimated by the DFE 200a, one of the DFEs 200a or 200b will correctly generate decisions for the symbol Sb and subsequent symbols Sc, ..., Sk, S(k+1), ....

The selection module 244 receives the decisions 218a and 218b, and the errors 252a and 252b. The selection module 244 compares the errors 252a and 252b. Based on comparing the errors 252a and 252b, the selection module 244 determines which of the decisions 218a and 218b are correct.

For example, if the DFE 200a correctly estimated the decision Dab for the symbol Sb, then an error function based on the error 252a will be less than an error function based on the error 252b, and accordingly, the selection module 244 selects the decision 218a and outputs the decision 218a as the final decision 218. On the other hand, if the DFE 200a incorrectly or erroneously estimated the decision Dab for the symbol Sb, then the error function based on the error 252b is less than the error function based on the error 252a, and accordingly, the selection module 244 selects the decision 218b and outputs the decision 218b as the final decision 218.

Comparing the error functions respectively based on the errors 252a and 252b is performed in any appropriate manner (e.g., using an appropriate error function). For example, the selection module 244 generates a first error function EA based on the errors Eaa, Eab, ..., Eak, Ea(k+1), ...; and also generates a second error function EB based on the errors Eba, Ebb, ..., Ebk, Eb(k+1). Subsequently, the selection module 244 compares the error functions EA and EB.

The error functions EA and EB can be any appropriate error functions. In an example, the selection module 244 adds up the absolute values of the errors Eab, ..., Eak, Ea(k+1), ..., to generate the error function EA; and also adds up the absolute values of the errors Ebb, ..., Ebk, Eb(k+1), ..., to generate the error function Eb. Subsequently, the selection module 244 compares the error functions EA and EB.

In another example, the error function EA is determined to be an additional of a square of each of the errors Eab, ..., Eak, Ea(k+1), ..., (i.e., $EA=Eab^2+ \ldots +Eak^2+Ea(k+1)^2 \ldots$. Similarly, the error function EB is determined to be an additional of a square of each of the errors Ebb, ..., Ebk, Eb(k+1), ..., (i.e., $EB=Ebb^2+ \ldots +Ebk^2+Eb(k+1)^2 \ldots$. Subsequently, the selection module 244 compares the error functions EA and EB. In an embodiment, the number of terms included in each of the error functions EA and Eb is programmable (that is, the number of errors on which each of the error functions EA and Eb is based on is programmable). The error functions EA and EB can be generated by any other appropriate manner as well.

Figure 4:
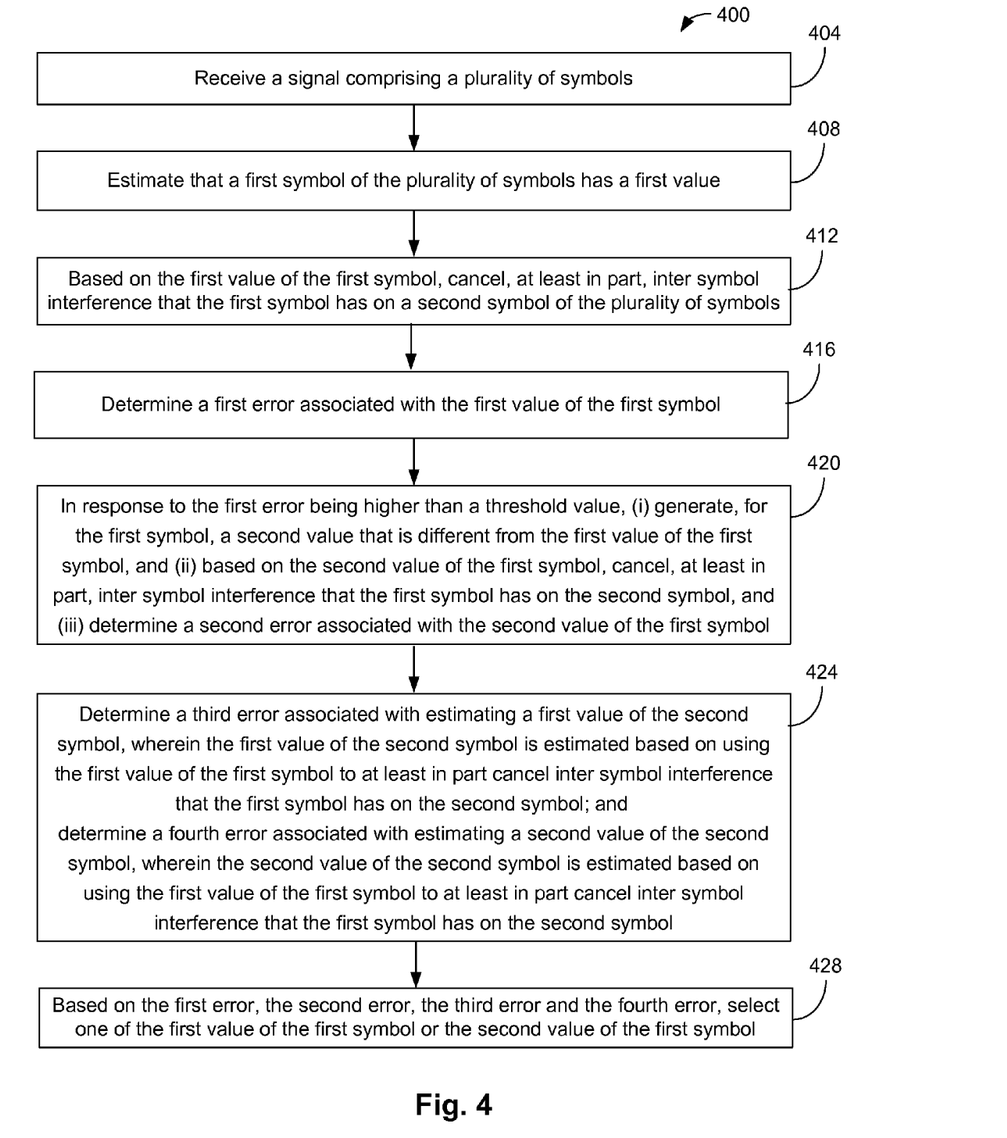
FIG. 4 is a flow diagram of an example method for operating the system of FIG. 2, in accordance with an embodiment of the present disclosure.

FIG. 4 is a flow diagram of an example method 400 for operating the system 200 of FIG. 2. At 404, a signal (e.g., the signal 202) is received by the system 200. In an example, the signal comprises a plurality of symbols (e.g., symbols Sa, Sb, . . . , Sk, . . . ).

At 408, a first value (e.g., decision Dab) of a first symbol (e.g., symbol Sb) of the plurality of symbols is estimated (e.g., by the DFE 200*a*). At 412, based on the first value of the first symbol, inter symbol interference that the first symbol has on a second symbol (e.g., symbol Sc) of the plurality of symbols is cancelled (e.g., by the DFE 200*a*) at least in part. At 416, a first error associated with the first value of the first symbol (e.g., error Eab) is determined (e.g., by the DFE 200*a*).

At 420, in response to the first error being higher than a threshold value (e.g., as determined by the error detection module 240), a second value (e.g., decision Dcb) is generated for the first symbol (e.g., by the decision change module 248), where the second value of the first symbol is different from the first value of the first symbol. Also at 420, based on the second value of the first symbol, inter symbol interference that the first symbol has on the second symbol is at least in part cancelled (e.g., by the DFE 200*b*). Also, a second error associated with the second value of the first symbol (e.g., error Ebb) is determined (e.g., by the DFE 200*b*).

At 424, a third error (e.g., error Eac) associated with estimating a first value of the second symbol is determined, where the first value of the second symbol is estimated (e.g., by the DFE 200*a*) based on using the first value of the first symbol to at least in part cancel inter symbol interference that the first symbol has on the second symbol. Also at 424, a fourth error (e.g., error Ebc) associated with estimating a second value of the second symbol is determined, where the second value of the second symbol is estimated based on using the first value of the first symbol to at least in part cancel inter symbol interference that the first symbol has on the second symbol.

At 428, based on the first error, the second error, the third error and the fourth error, one of the first value of the first symbol or the second value of the first symbol is selected (e.g., by the selection module 244) and output.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   receiving a signal comprising a plurality of symbols;
   estimating a first value of a first symbol of the plurality of symbols;
   based on the first value of the first symbol, cancelling, at least in part, inter symbol interference that the first symbol has on a second symbol of the plurality of symbols;
   determining a first error associated with the estimation of the first value of the first symbol; and
   in response to the first error being higher than a threshold value,
      generating, for the first symbol, a second value that is different from the first value of the first symbol, and
      based on the second value of the first symbol, cancelling, at least in part, inter symbol interference that the first symbol has on the second symbol.

2. The method of claim 1, further comprising:
   determining a second error associated with the second value of the first symbol;
   determining a third error associated with estimating a first value of the second symbol, wherein the first value of the second symbol is estimated based on using the first value of the first symbol to at least in part cancel inter symbol interference that the first symbol has on the second symbol; and
   determining a fourth error associated with estimating a second value of the second symbol, wherein the second value of the second symbol is estimated based on using the first value of the first symbol to at least in part cancel inter symbol interference that the first symbol has on the second symbol.

3. The method of claim 2, further comprising:
   based on (i) the first error, (ii) the second error, (iii) the third error and (iv) the fourth error, selecting one of the first value of the first symbol or the second value of the first symbol.

4. The method of claim 2, further comprising:
   based on the first error and the third error, generating a first error function;
   based on the second error and the fourth error, generating a second error function; and
   based on comparing the first error function and the second error function, selecting one of the first value of the first symbol or the second value of the first symbol.

5. The method of claim 4, further comprising:
   storing, in a selection module, (i) the first value of the first signal, (ii) the second value of the first signal, (iii) a first value of the second signal that is estimated based on the first value of the first symbol, and (iv) a second value of the second signal that is estimated based on the second value of the first symbol; and
   based on selecting one of the first value of the first symbol or the second value of the first symbol, outputting, by the selection module, one of (i) the first value of the first signal and the first value of the second signal, or (ii) the second value of the first signal and the second value of the second signal.

6. The method of claim 1, wherein:
   based on the first value of the first symbol, cancelling, at least in part, inter symbol interference that the first symbol has on the second symbol comprises
      utilizing a first decision feedback equalizer to use the first value of the first symbol to at least in part cancel inter symbol interference that the first symbol has on the second symbol; and based on the second value of the first symbol, cancelling, at least in part, inter symbol interference that the first symbol has on the second symbol comprises
utilizing a second decision feedback equalizer to use the first value of the first symbol to at least in part cancel inter symbol interference that the first symbol has on the second symbol.

7. The method of claim 6, wherein:
the first decision feedback equalizer is different from the second decision feedback equalizer; and
the first decision feedback equalizer operates in parallel to the second decision feedback equalizer.

8. The method of 6, wherein the second decision feedback equalizer has a feedback filter configured to generate a feedback signal that is used in part to cancel inter symbol interferences, and wherein the method further comprises:
based on a comparison of the first error with the threshold value, selectively receiving, by the feedback filter of the second decision feedback equalizer, one of (i) a decision from the first decision feedback equalizer, (ii) a decision from the second decision feedback equalizer, or (iii) a decision that is generated based on the decision from the first decision feedback equalizer.

9. The method of claim 8, wherein the first decision feedback equalizer has a feedback filter configured to generate a feedback signal that is used in part to cancel inter symbol interferences, and wherein the method further comprises:
receiving, by the feedback filter of the first decision feedback equalizer, the decision from the first decision feedback equalizer,
wherein the feedback filter of the first decision feedback equalizer does not receive any decision from the second decision feedback equalizer.

10. The method of claim 1, further comprising:
in response to the first error being lower than the threshold value, refraining from using the second value of the first symbol to cancel any inter symbol interference.

11. A system comprising:
a first decision feedback equalizer;
a second decision feedback equalizer, wherein each of the first decision feedback equalizer and the second decision feedback equalizer is configured to receive a signal comprising a plurality of symbols, wherein the first decision feedback equalizer is further configured to (i) estimate a first value of a first symbol of the plurality of symbols, (ii) based on the first value of the first symbol, cancel, at least in part, inter symbol interference that the first symbol has on a second symbol of the plurality of symbols, and (iii) determine a first error associated with the estimation of the first value of the first symbol; and
an error detector module configured to detect whether the first error is higher than a threshold value,
wherein the second decision feedback equalizer is further configured to, in response to the first error being higher than the threshold value, (i) receive a second value of the first symbol that is different from the first value of the first symbol, and (ii) based on the second value of the first symbol, cancel, at least in part, inter symbol interference that the first symbol has on the second symbol.

12. The system of claim 11, wherein:
the second decision feedback equalizer is further configured to determine a second error associated with the second value of the first symbol;
the first decision feedback equalizer is further configured to determine a third error associated with estimating a first value of the second symbol, wherein the first value of the second symbol is estimated based on using the first value of the first symbol to at least in part cancel inter symbol interference that the first symbol has on the second symbol; and
the second decision feedback equalizer is further configured to determine a fourth error associated with estimating a second value of the second symbol, wherein the second value of the second symbol is estimated based on using the first value of the first symbol to at least in part cancel inter symbol interference that the first symbol has on the second symbol.

13. The system of claim 12, further comprising:
a selection module configured to, based on (i) the first error, (ii) the second error, (iii) the third error and (iv) the fourth error, select one of the first value of the first symbol or the second value of the first symbol.

14. The system of claim 12, further comprising:
a selection module configured to (i) based on the first error and the third error, generate a first error function, (ii) based on the second error and the fourth error, generate a second error function, and (iii) based on a comparison of the first error function and the second error function, select one of the first value of the first symbol or the second value of the first symbol.

15. The system of claim 14, wherein the selection module is further configured to:
store (i) the first value of the first signal, (ii) the second value of the first signal, (iii) a first value of the second signal that is estimated based on the first value of the first symbol, and (iv) a second value of the second signal that is estimated based on the second value of the first symbol; and
based on selecting one of the first value of the first symbol or the second value of the first symbol, output one of (i) the first value of the first signal and the first value of the second signal, or (ii) the second value of the first signal and the second value of the second signal.

16. The system of claim 10, further comprising:
a decision change module configured to, in response to the first error being higher than a threshold value, (i) generate the second value of the first symbol that is different from the first value of the first symbol, and (ii) transmit the second value of the first symbol to the second decision feedback equalizer.

17. The system of claim 11, wherein:
the first decision feedback equalizer is different from the second decision feedback equalizer; and
the first decision feedback equalizer operates in parallel to the second decision feedback equalizer.

18. The system of 11, wherein:
the second decision feedback equalizer comprises a feedback filter configured to generate a feedback signal that is used in part to cancel inter symbol interferences; and
the feedback filter of the second decision feedback equalizer is configured to, based on a comparison of the first error with the threshold value, selectively receive one of (i) a decision from the first decision feedback equalizer, (ii) a decision from the second decision feedback equalizer, or (iii) a decision that is generated based on the decision from the first decision feedback equalizer.

19. The system of claim 18, wherein:
the first decision feedback equalizer comprises a feedback filter configured to generate a feedback signal that is used in part to cancel inter symbol interferences;
the feedback filter of the second decision feedback equalizer is configured to receive the decision from the first decision feedback equalizer; and the feedback filter of the first decision feedback equalizer does not receive any decision from the second decision feedback equalizer.

20. The system of claim 11, wherein:

the second decision feedback equalizer is further configured to, in response to the first error being lower than the threshold value, refrain from using the second value of the first symbol to cancel any inter symbol interference.

* * * * *